March 6, 1934. E. A. AKERSON 1,950,075
ARTIFICIAL BAIT
Filed Nov. 12, 1931
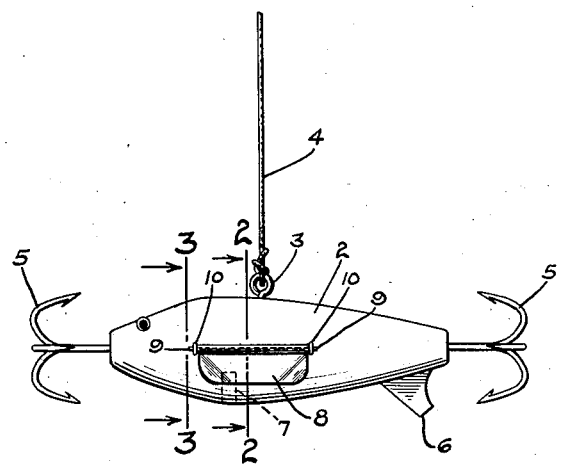
Fig.1
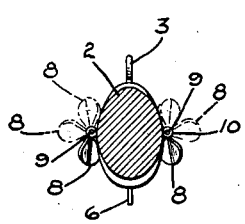
Fig.3
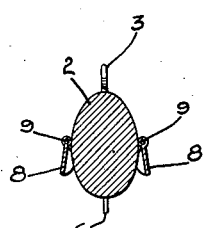
Fig.2
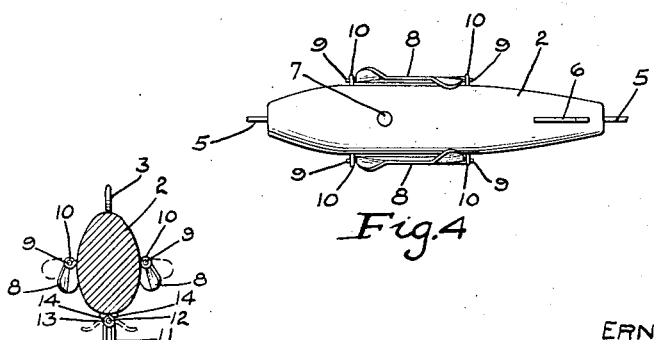
Fig.4
Fig.5
INVENTOR
ERNEST A. AKERSON
By
ATTORNEYS Patented Mar. 6, 1934

1,950,075

UNITED STATES PATENT OFFICE 1,950,075

ARTIFICIAL BAIT

Ernest A. Akerson, Lindstrom, Minn.

Application November 12, 1931, Serial No. 574,556

3 Claims. (Cl. 43—46)

This invention relates to new and useful improvements in artificial baits and more particularly to such a bait adapted for still fishing.

An object of the invention is to provide an artificial bait comprising a body provided with suitable hooks fore and aft, and having wing members pivotally mounted upon the sides thereof adapted to be actuated by the pressure of the water, when the bait is given an up-and-down movement in the water, whereby it may be caused to flutter in a manner similar to the actions of the pectoral fins of a minnow.

A further object is to provide an artificial bait comprising a body simulating the body of a minnow and provided with means for attaching a fish line thereto so that the bait may be suspended in the water, said body having means for retaining it in an upright position and provided at its opposite ends with suitable hooks, and a wing member being pivotally mounted upon each side of the body and adapted to swing about axes disposed lengthwise thereof, whereby when the bait is given an up-and-down movement in the water, the pressure of the water acting against said wings will impart an oscillatory movement thereto very similar to the movements of the pectoral fins of a fish.

A further object is to provide an artificial bait provided with wing members adapted to simulate fins and having means for preventing them from folding flatly against the body of the bait, when the latter is moved up and down in the water, so as to permit the water to enter the space between the wing members and said body and thereby actuate them when the bait is manipulated in the water.

A further object is to provide an improved artificial bait comprising a body having wing members pivotally supported upon the sides thereof, and additional wing members pendently supported from the lower portion thereof, all of said wing members being adapted to be given a swinging or fluttering movement in the water, when an up-and-down movement is imparted to the bait by manipulation of its supporting means.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing:

Figure 1 is a side elevation of my improved bait showing the positions assumed by the wing members, when the bait is held stationary;

Figure 2 is a cross sectional view on the line 2—2 of Figure 1 showing a means for preventing the wings from folding flatly against the sides of the body of the bait;

Figure 3 is a cross sectional view on the line 3—3 of Figure 1 showing in full and dotted lines the movement imparted to the wings when the bait is given an up-and-down movement in the water;

Figure 4 is a bottom view of Figure 1 with some of the parts broken away; and

Figure 5 is a cross-sectional view showing a construction wherein additional wing members are pivotally secured to the lower portion of the body.

The novel bait featured in the invention comprises an elongated body 2 shaped to simulate the body of a minnow or small fish, and is shown provided with a suitable eye 3 to which a suitable fish line 4 may be attached. A gang hook 5 is shown provided at each end of the body, and a stabilizing fin 6 may be provided at the rear portion thereof to prevent the bait from rotating in a horizontal plane, when suspended in the water. To balance the bait, a suitable weight 7 may be embedded in the lower portion of the body, as indicated in dotted lines in Figure 1 and full lines in Figure 4.

An important feature of the invention resides in the means provided upon each side of the body 2 adapted to simulate the pectoral fins of a fish. Such means is here shown as comprising a pair of wing members 8, preferably of sheet metal, pivotally supported in suitable eyes 10 secured to the body 2, as will be readily understood by reference to Figures 1 and 3. To thus support the wing members upon the body 2, suitable rods 9 may be secured to the edges of the wing members and have their terminals adapted to be received in the eyes 10.

The wing members 8 are adapted to relatively swing up-and-down when an up-and-down motion is imparted to the body 2, when submerged in water, whereby said wings will simulate the fins of a minnow or fish. To prevent the wing members from folding flatly against the sides of the body, when the bait is moved up and down in the water, the front and rear portions of each wing member may be bent in opposite directions, as best shown in Figure 4, whereby the lower edges of said wing members will be spaced from the body as shown in Figure 2, so as to permit the water to enter behind the wing members when in their folded positions, whereby the pressure of the water acting on said wing members will cause them to swing up and down, as indicated by the full and dotted lines in Figure 3. If desired, other means may be provided for preventing the wing members from folding flatly against the body portion 2.

When used, the bait is lowered into the water the desired depth and the fisherman will then impart a slight up-and-down movement to the bait by means of a fish line attached thereto. Such up-and-down movement of the bait will cause the pressure of the water to act upon the wing members 8 and impart thereto a swinging or fluttering movement very similar to the actions of the pectoral fins of a fish. The bait is primarily adapted for still fishing and when manipulated as above stated, it will retain its upright position in the water, as shown in Figure 1. The wings 8, as hereinbefore stated, are preferably constructed of sheet metal and may be highly polished to provide an attractive lure for the fish.

The bait, as shown in Figure 1 is very simple and inexpensive and may be manufactured at a very small cost. By pivoting the wing members 8, as shown, a very slight up-and-down movement is required to actuate the wings, it being understood that when the bait is moved upwardly, the pressure of the water will cause the wings to assume the full line position shown in Figure 3, and when the bait is lowered in the water, the wings will assume the upper dotted line positions shown in Figure 3.

In Figure 5, there is shown a construction wherein additional wing members 11 are provided at the lower portion of the body 2. These wing members may be pendently supported upon a pivot pin 12 suitably secured to the body by such means as eyes 13. Each wing member 11 is preferably provided with a suitable stop lug 14 adapted to engage the body 2, when the wings are in their normal position as shown in full lines, to limit the movements of the wings in a downward direction. The lower edges of the wings 11 are so shaped that when the bait is moved up and down in the water, a swinging or fluttering movement will be imparted thereto in a manner similar to that imparted to the upper wing members 8. The bait may be provided with or without the lower wing members, as desired.

I claim as my invention:

1. An artificial bait comprising a body provided with suitable hooks, an elongated wing member mounted upon each side of said body, and means for spacing the outer edges of the wings from said body portion to cause the water to alternately impinge against opposite sides of said wings, when the bait is given an up-and-down motion in the water, whereby a fluttering movement is imparted to said wings simulating substantially the movements of the pectoral fins of a fish.

2. An artificial bait comprising an elongated body provided with suitable hooks fore and aft, means whereby said body may be suspended from a line, wing members pivotally mounted upon the sides of said body and adapted to swing about horizontally disposed axes, and means for preventing said wings from folding flatly against the sides of said body into inoperative positions, when an up-and-down motion is imparted to the bait when submerged in water.

3. An artificial bait comprising an elongated body provided with suitable hooks fore and aft, means whereby said body may be suspended from a suitable line, a pair of wing members pivotally mounted upon the sides of said body, and means on said wings adapted to engage said body to prevent the wings from folding flatly against the body, when the bait is given an up-and-down movement in the water.

ERNEST A. AKERSON.